March 24, 1964  T. J. SWOBODA  3,126,492
FERROMAGNETIC ENERGY DEVICES
Filed March 22, 1962  6 Sheets-Sheet 3
FIG. III
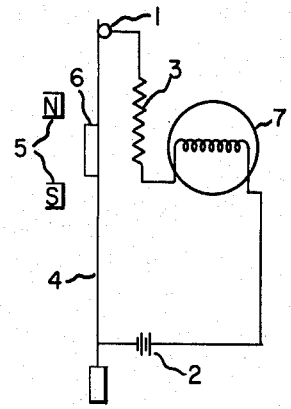
FIG. IV
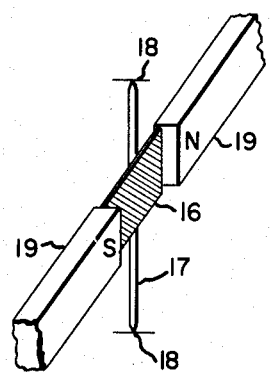
FIG. VI
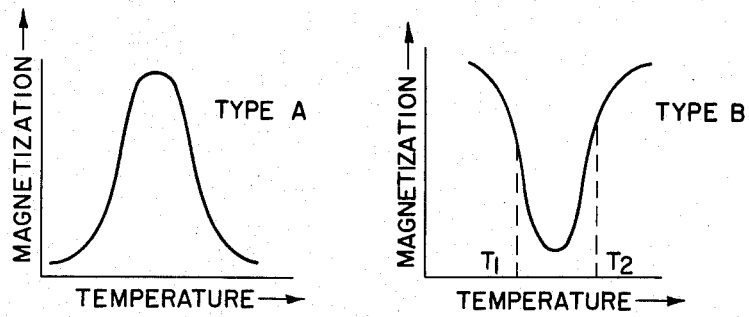
FIG. V
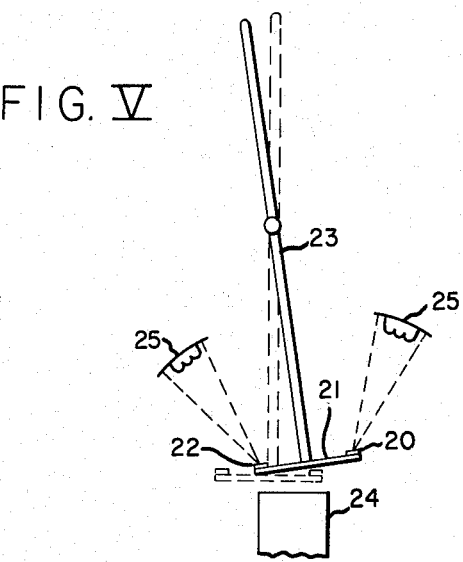
INVENTOR
THOMAS J. SWOBODA
BY C. Harold Herr
ATTORNEY

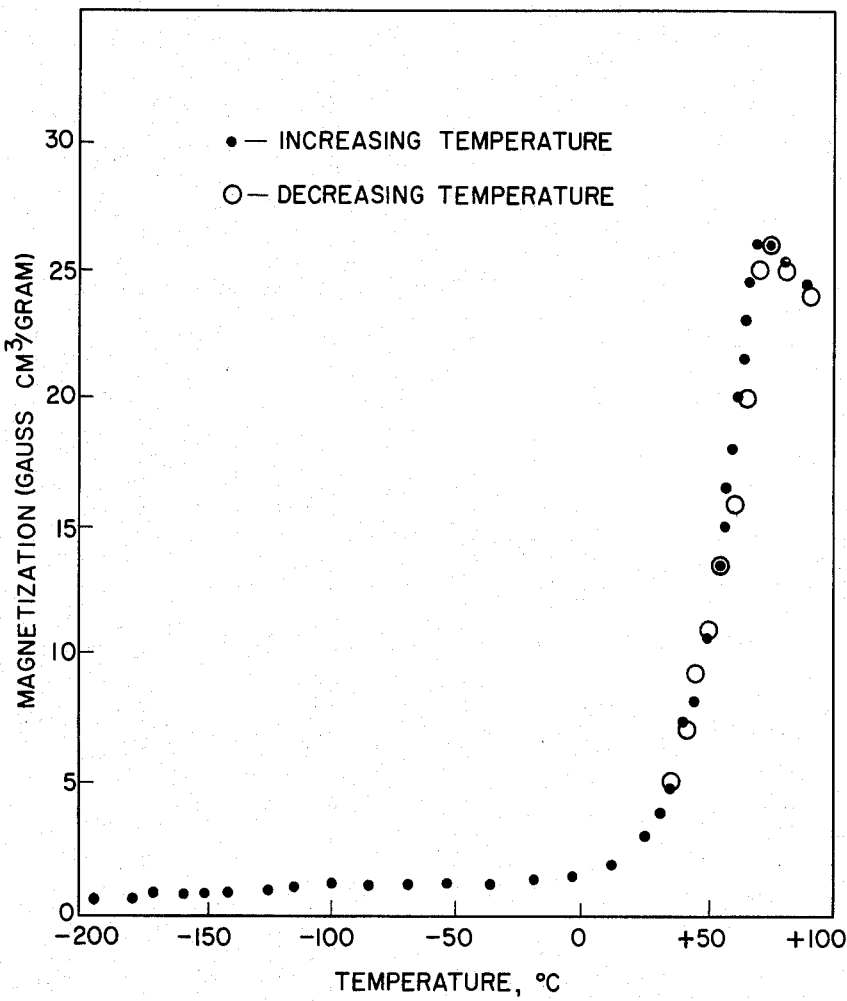

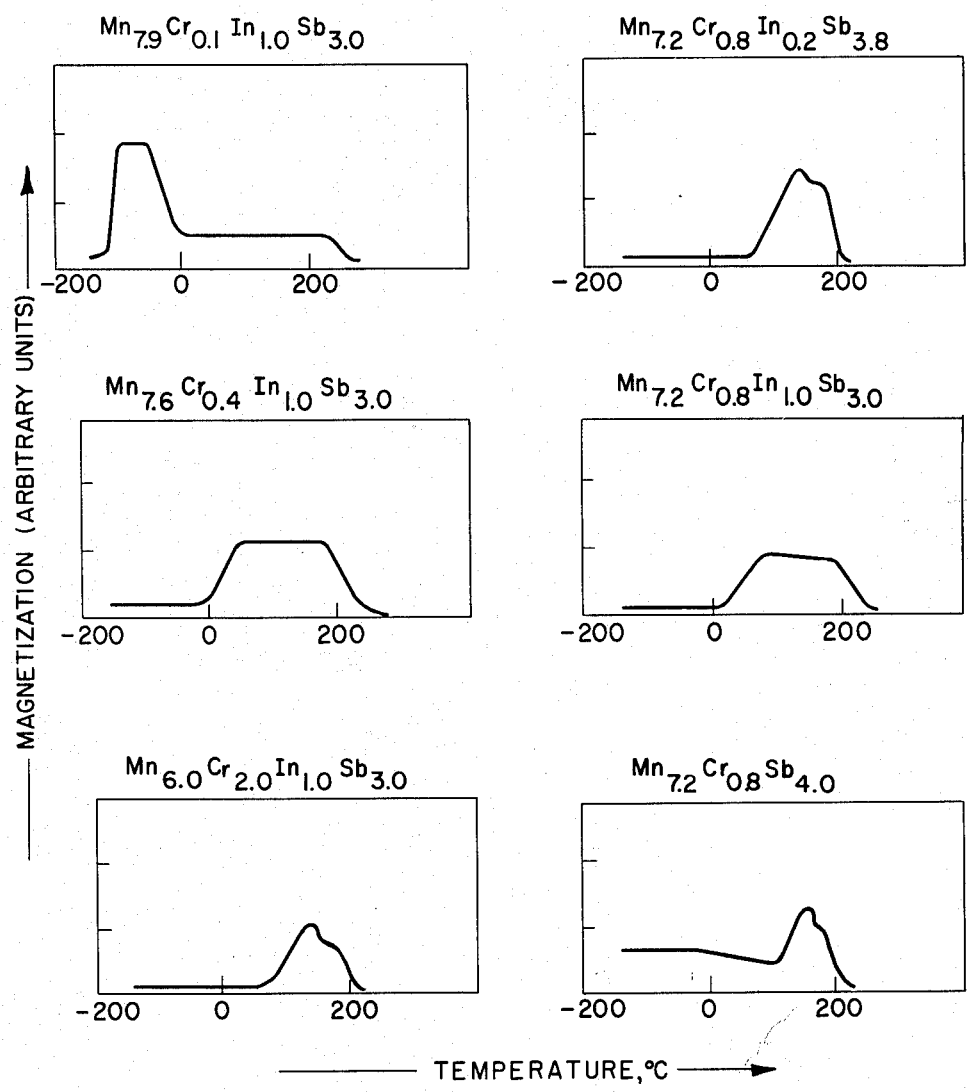

FIG. VII
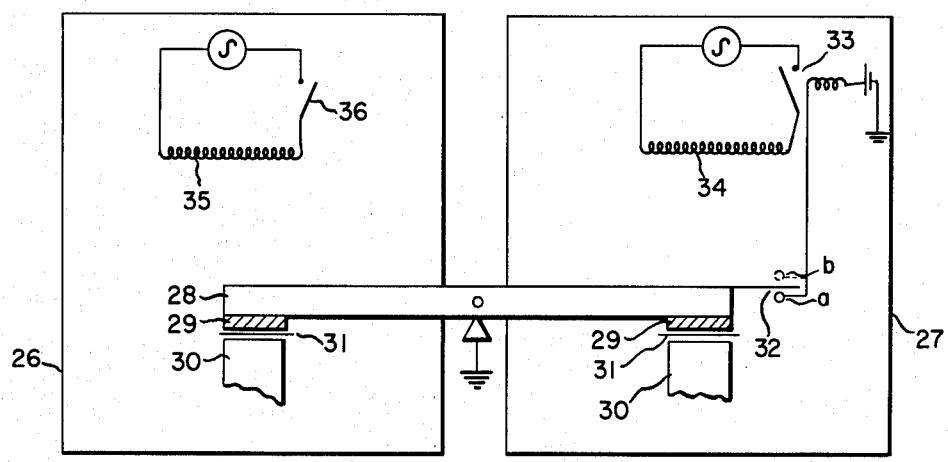
FIG. VIII
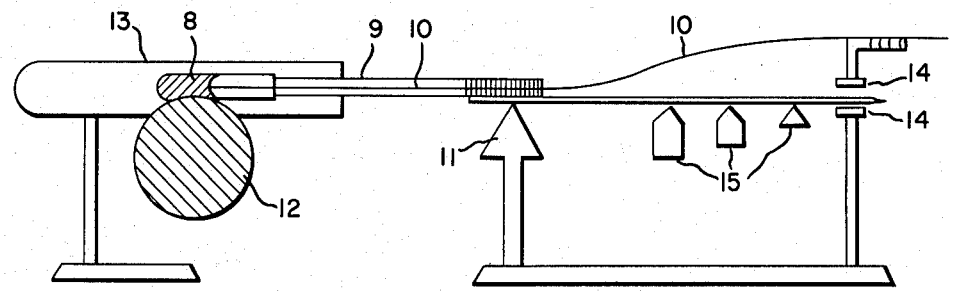

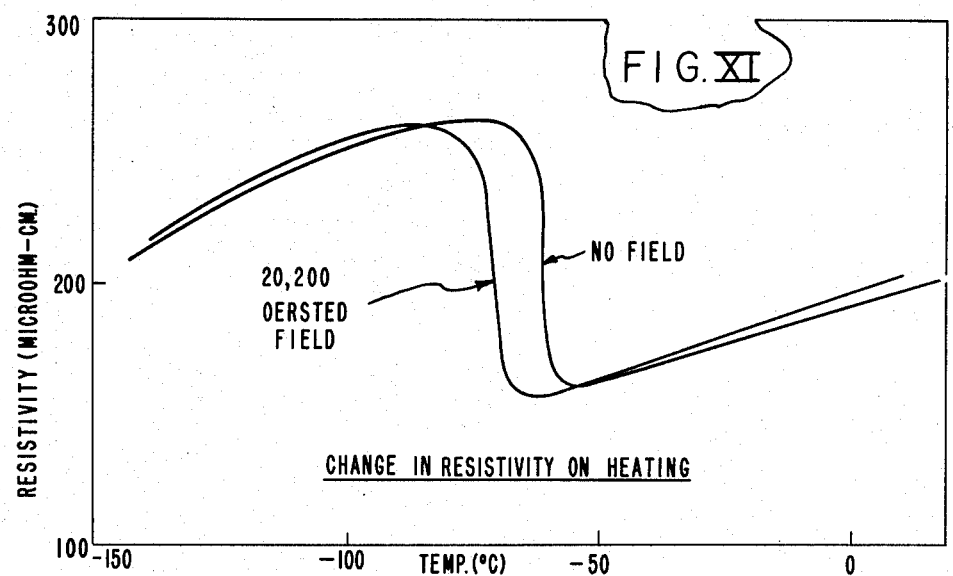
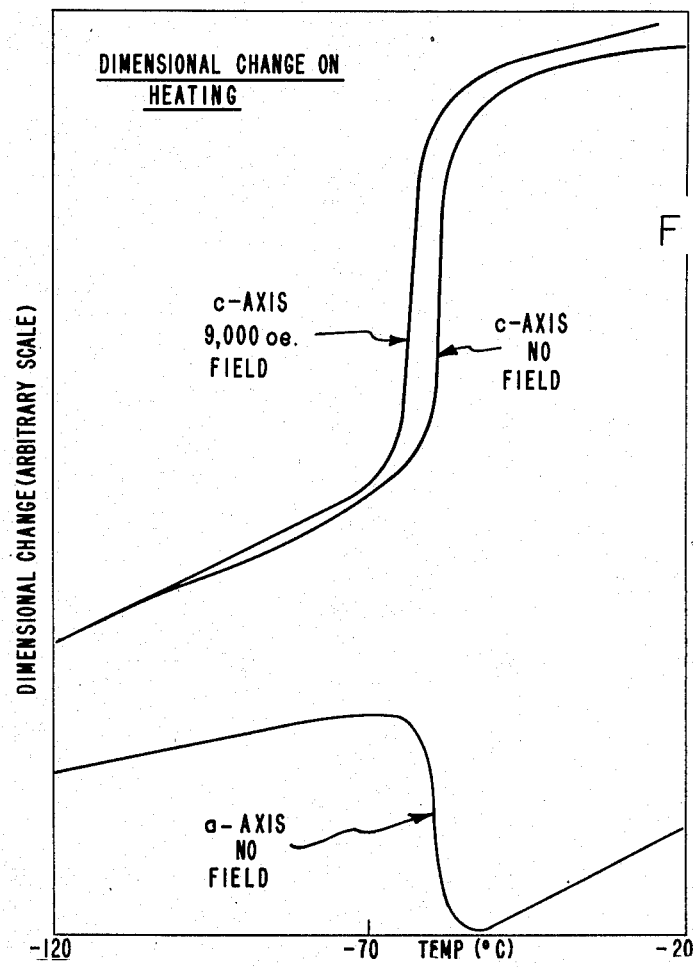

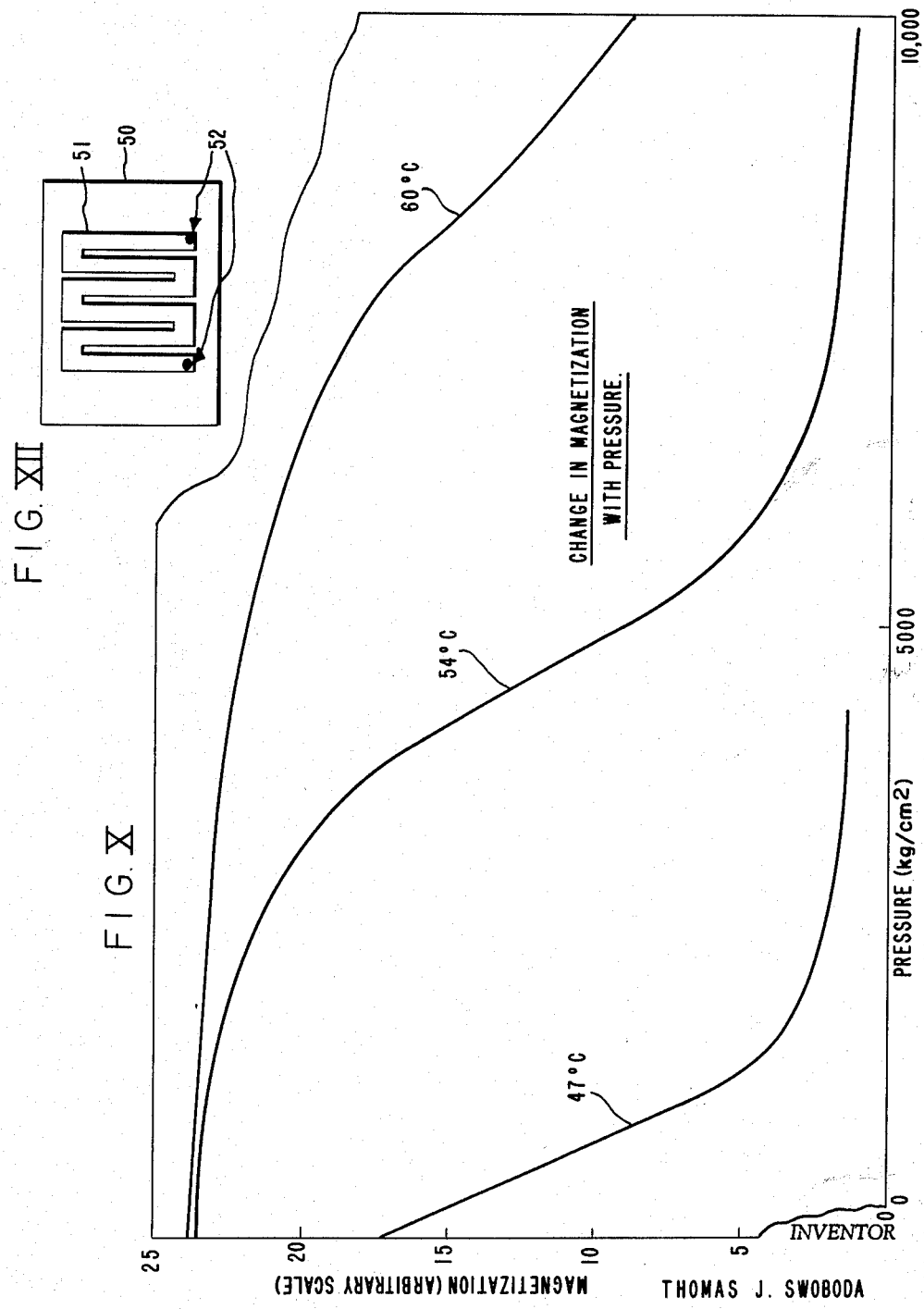

United States Patent Office 3,126,492
Patented Mar. 24, 1964

3,126,492
FERROMAGNETIC ENERGY DEVICES
Thomas J. Swoboda, Chester County, Pa., assignor to E. I. du Pont de Nemours and Company, Wilmington, Del., a corporation of Delaware
Filed Mar. 22, 1962, Ser. No. 181,629
8 Claims. (Cl. 310—4)

This invention relates to devices for the interconversion and control of various forms of energy based on ferromagnetic compositions having a maximum saturation induction within a restricted temperature range and a very much smaller induction at temperatures both above and below this range.

This application is a continuation-in-part of my copending applications Serial Nos. 776,098, filed November 24, 1958, now abandoned, 19,370, filed April 1, 1960, abandoned, 66,194, filed October 31, 1960, and 125,511, filed July 20, 1961, now abandoned.

The usual ferromagnetic materials retain their ferromagnetic behavior down to very low temperatures, i.e., temperatures as low as the boiling point of liquid helium and below, and are characterized by a magnetic response that decreases as temperature is increased so that above a certain temperature, known as the Curie temperature, the response becomes that of a paramagnetic material. Such materials have been employed in devices whose operation involves transformation of energy from one form to another. Certain of these devices, such as the common household thermostat based upon a bi-metallic temperature responsive element, often employ a permanent magnet as an accessory to improve performance. In devices of another type, the magnetic element itself is primarily responsible for operation. Among such devices are the motor of Van der Maas and Purvis [Am. J. Phys., 24, 176 (1956)] and the thermoelectric generator of Schwarzkopf (U.S. 2,016,100). The mode of operation and manner of construction of such devices is influenced by the fact that for most ferromagnetic materials, saturation decreases monotonically with increasing temperature up to the Curie point.

It is an object of this invention to provide novel devices for the interconversion and control of various forms of energy. A further object is to provide such devices based upon compositions which exhibit a maximum saturation induction in a restricted range of temperature and a much lower saturation induction at temperatures both above and below this range. A further object is to provide methods for the interconversion and control of various forms of energy.

These and other objects of this invention are obtained by providing novel devices for the interconversion of various forms of energy which devices depend for their operation upon a component which exhibits a sharp and reversible increase in saturation induction with rise in temperature at a temperature below the Curie point. In their essential features, these devices comprise at least three components, viz., (a) the magnetic component just described, (b) means for applying a form of energy to the magnetic component, and (c) means for removing and utilizing the energy from the magnetic component. For some applications such devices will have additional components, e.g., a means for controllably magnetizing and demagnetizing the magnetic component.

Energy may be introduced into or derived from the devices of this invention in any of several forms, for example as electric energy, magnetic energy, heat or mechanical energy. Thus, through the agency of these devices, a variety of energy interconversions are possible since energy can be supplied in any of the above forms and delivered in any other of these forms. For example, thermal energy can be converted to magnetic, mechanical, or electrical energy. Conversely, electrical, mechanical or magnetic energy can be converted to thermal energy. Similarly, magnetic energy can be converted to mechanical or electrical energy and mechanical energy can be converted to electrical or magnetic energy.

For better understanding of the present invention, together with other and further objects thereof, reference is made to the following detailed description taken in connection with the accompanying drawings, in which:

FIG. I is a typical magnetization-temperature plot for a ferromagnetic composition useful in devices of this invention.

FIG. II is a series of magnetization-temperature curves for several other compositions useful in devices of the invention.

FIG. III is a schematic representation of a magnetic switch employing as the magnetic component an antimonide of this invention.

FIG. IV is a partially schematic representation of a device for measuring radiation intensity according to the present invention.

FIG. V is a partially schematic representation of a reciprocating engine.

FIG. VI is a pair of magnetization-temperature plots for two types of composites useful as magnetic components in devices of this invention, Type A exhibiting a magnetization-temperature curve having a pronounced maximum and Type B a pronounced minimum in saturation induction with temperature change.

FIG. VII is a partially schematic representation of a novel device for maintaining a constant temperature difference between two chambers.

FIG. VIII is a partially schematic representation of a magnetic balance.

FIG. IX is a plot showing dimensional changes brought about by heating and/or application of a magnetic field which occur in a representative composition useful in devices of this invention.

FIG. X is a plot showing the relationship between applied pressure and magnetization at several temperatures for a representative material useful in devices of this invention.

FIG. XI is a plot showing the change in resistivity on heating with or without application of a magnetic field for a representative material useful in devices of this invention.

FIG. XII is partially schematic representation of a resistor according to the present invention.

COMPOSITIONS USEFUL IN DEVICES AND METHODS

Among compositions useful in devices and methods of this invention are compositions as more fully described in my application Serial No. 181,744, filed on even date herewith which contain at least two transition elements selected from groups V–B, VI–B, and VII–B of the periodic table, of which at least one is taken from the first row of said transition elements, and at least one element of group V–A selected from As and Sb, and which are further characterized by having a maximum saturation induction at a temperature above 0° K. but below the Curie point of the composition.

In these compositions, said group V–A element(s) constitutes 5–40 atom percent of the whole and will generally be in the range of 5–35 atom percent. It will be understood that at least one group V–A element of the group consisting of arsenic and antimony is always present in the compositions. Nitrogen, phosphorus and bismuth may also be present. Of the remaining components, the transition metals of groups V–B, VI–B, and VII–B of the periodic table, i.e., at least two of V, Cr, Mn, Nb, Mo, Ta, W and Re, of which at least one is selected from V, Cr and Mn, constitute from 35–95 atom percent, any other element present being a metal from groups II–IV of the periodic table in an amount of not more than 30 atom percent. Suitable examples of such other elements are cadmium, gallium, indium, lead, thallium, tin, zirconium, scandium, yttrium, magnesium and zinc. Ordinarily one of the transition metals enumerated above will constitute the major proportion of the transition metal content of the composition while the second transition metal will be present in minor proportion. However, in no case will the content of the second transition metal be less than 0.1 atom percent based on the total composition.

The periodic table referred to herein is the one appearing in Deming's "General Chemistry," John Wiley & Sons, Inc., 5th Ed., Chap. 11.

Compositions which are particularly useful in the devices and methods of this invention contain antimony, manganese, and at least one additional transition metal, particularly chromium, vanadium, molybdenum or niobium, and optionally one or more additional elements selected from the group consisting of bismuth, indium, cadmium, lead, zirconium, tin, gallium, thallium, scandium, yttrium, magnesium and zinc.

Examples of useful compositions are those containing antimony, 5–40 atom percent; manganese, 35–91.9 atom percent; at least one element of the group chromium and vanadium, 0.1–38.5 atom percent; and optionally an element of the group bismuth, cadmium, gallium, indium, lead, thallium, tin, zirconium, scandium, yttrium, magnesium and zinc, 0–30 atom percent, the percentage values being so chosen as to total 100%.

Other useful compositions contain antimony, 5–35 atom percent; manganese, 25–75 atom percent; at least one element of the group molybdenum and niobium, 0.1–50 atom percent; and optionally an element of the group bismuth, cadmium, gallium, indium, lead, thallium, tin, zirconium, scandium, yttrium, magnesium and zinc, 0–30 atom percent.

The foregoing compositions can be described by the formula $Mn_aX_bZ_cSb_d$, where X is chromium, vanadium, molybdenum, or niobium; Z is bismuth, indium, cadmium, gallium, lead, thallium, tin, zirconium, scandium, yttrium, magnesium or zinc; and $a$, $b$, $c$, and $d$ are the atomic proportions of the elements employed and are chosen so as to provide percentage compositions in the ranges stated above. Compositions, in which X and/or Z represent a combination of two or more elements, can also be employed in the devices of this invention.

Particularly useful compositions are those containing 53.5–91.9 atom percent manganese, 8–35 atom percent antimony, and 0.1–38.5 atom percent of an additional element of the group chromium, vanadium and mixtures thereof. These compositions can be described by the formula $Mn_aX_bSb_d$, where X is chromium and/or vanadium, and $a$, $b$, and $d$ are the above indicated atomic proportions of the elements, $a$, $b$, and $d$ totalling 1. Especially useful compositions have the formula $Mn_{2-x}X_xSb$, where $x$ is 0.003–0.41, it being understood that the sum of the subscripts to Mn, X and Sb is 3.

Other useful compositions are those containing antimony, 5–35 atom percent; manganese, 35–70 atom percent; at least one element of the group chromium and vanadium, 0.8–25 atom percent; and an element of the group bismuth, cadmium, gallium, indium, lead, thallium, tin, zirconium, scandium, yttrium, magnesium and zinc, 0–30 atom percent, the percentage values being so chosen as to total 100%.

Iron-rhodium alloys and iron-rhodium alloys containing up to 20 atom percent of, for example, Mn, Ru, Ir, Pd, Ag, Au and Pt are also useful in devices and methods of this invention. Suitable alloys include those described by Fallot, Revue Scientifique 77, 498 (1939); Kouvel et al., General Electric Research Report No. 61–RL–2870M; and by P. H. L. Walter, U.S. applications Serial Nos. 177,229 and 177,230, filed March 5, 1962.

Further compositions which can be employed in devices and methods of this invention have a tetragonal crystal structure and contain manganese in an amount of at least 40 atom percent, a second metallic component selected from iron, cobalt, nickel, copper and zinc, in an amount of 0.6–25 atom percent, and at least one of arsenic, antimony and bismuth in an amount of 25–40 atom percent. Additional components selected from the elements of groups III–A, III–B, IV–A, and IV–B, in an amount of 0–12.5 atom percent may also be present. These compositions are described more fully in my application Serial No. 66,194, filed October 31, 1960.

Still other compositions useful in the present invention are described in application Serial No. 66,195, filed October 31, 1960, in the name of T. A. Bither. These compositions have a tetragonal crystal structure and contain a single transition metal selected from chromium, manganese, iron, cobalt, or nickel in an amount of 61–75 atom percent, and from 25–39 atom percent of at least two elements selected from gallium, germanium, selenium, tellurium, arsenic, antimony and bismuth, of which at least the major atom percent consists of phosphorus, arsenic, antimony, and/or bismuth.

Other particularly desirable compositions for use in the present invention are manganese-antimony arsenide and manganese-germanium antimonide containing 61–75 atom percet manganese, up to 20 atom percent arsenic or germanium, and the balance antimony. Further desirable compositions are manganese-cobalt antimonide, manganese-zinc antimonide, and iron-rhodium alloys. As indicated above, the presence of additional elements in the composition may sometimes have a beneficial effect.

It is desirable for certain applications that the low temperature ferromagnetic transition occur over a small temperature interval and produce a large change in saturation induction. The temperature range over which the transition occurs is, of course, affected by changes in composition of the magnetic phase and can be adjusted to suit a particular device. The most useful compositions exhibit a saturation induction below the lower ferromagnetic temperature, which is not more than about $\frac{1}{10}$ of the maximum saturation induction above this temperature.

For many devices, a composition exhibiting a very sharp increase in saturation induction is desirable. The range of temperature over which the increase in saturation induction occurs can readily be minimized by preparing the composition in single crystal form or by quenching and annealing as taught by W. W. Gilbert in application Serial No. 120,679, filed June 29, 1961. This process involves quenching the molten composition to a temperature below its solidification temperature, annealing at a high temperature below the solidification temperature and cooling slowly. Optionally a chalcogen-reactive reagent, e.g., Al, may be added to the molten composition prior to quenching.

TYPICAL PREPARATION

The compositions useful in devices of this invention can be prepared by heating mixtures of the elements or compounds and alloys thereof to a temperature in the range of 600° to 1500° C. or more. For manganese-chromium and/or vanadium antimonides, temperatures of 600°–1050° C., or preferably 700–975° C., are usually employed. Temperatures of at least 850° C. are generally necessary if the composition is to be melted.

The preparation of a typical material useful in the devices of this invention is described in the following paragraphs.

A. An intimate mixture of manganese, chromium, indium and antimony (atom percent, respectively, 55.5, 11.1, 16.7, 16.7) in finely divided form was placed in a quartz tube which was then evacuated and sealed. The tube was placed in a furnace at 910° C. and maintained at this temperature for 22 hours. The quartz tube was then removed from the furnace, cooled rapidly in air and opened. The product was a metallic appearing slug which exhibited maximum saturation induction at 62° C. with upper (Curie point) and lower ferromagnetic transition temperatures at 238° and −20° C., respectively.

For purification, a portion of the slug was ground in an agate mortar and treated with two changes of 20% (by weight) aqueous tartaric acid followed by treatment with a solution of 0.5% (by weight) picric acid, and 3% (by volume) concentrated hydrochloric acid in absolute ethanol. After each of these treatments, the dried solid was agitated in a magnetic field to separate magnetic from non-magnetic material. The purified product gave an X-ray pattern as follows (after subtraction of weak reflections caused by the presence of traces of antimony, indium and indium antimonide).

Interplanar spacings are expressed in angstrom (A.) units. Relative intensities are indicated as follows: S designates the strongest line recorded; $M_1$, $M_2$, $M_3$, and $M_4$ are medium intensity lines of successively decreasing intensity; F means that the line is faint; VF and VVF mean very faint and extremely faint, respectively.

*X-Ray Pattern of Chromium-Indium-Manganese Antimonide*

| Interplanar spacings: | Relative intensities |
| --- | --- |
| 6.5 | VVF |
| 3.46 | $M_2$ |
| 3.26 | $M_4$ |
| 2.89 | $M_2$ |
| 2.64 | $M_3$ |
| 2.16 | S |
| 2.04 | $M_1$ |
| 1.954 | VVF |
| 1.921 | VF |
| 1.757 | F |
| 1.729 | F |
| 1.630 | VF |
| 1.486 | $M_4$ |
| 1.443 | $M_4$ |
| 1.420 | VVF |
| 1.398 | F |
| 1.331 | VVF |
| 1.320 | F |
| 1.290 | VF |
| 1.273 | $M_4$ |
| 1.265 | VVF |
| 1.242 | VVF |
| 1.216 | VVF |
| 1.200 | $M_2$ |
| 1.190 | $M_4$ |

A tetragonal structure of the $Cu_2Sb$-type having cell constants of $a_0$, 4.08 A.; and $c_0$, 6.51 A. is consistent with these data.

B. A second sample was prepared as described above, using a heating cycle of 20 hours at 920–925° C. This sample exhibited maximum saturation induction at 58° C. and a Curie temperature of 243–246° C. After purification by extraction in turn with picric acid-concentrated hydrochloric acid in ethanol and with 5% aqueous sulfuric acid, and by magnetic separations, magnetic properties were determined in a field of 2000 oersteds. Saturation per gram, $\sigma_s$, at 65° C. was in excess of 20 gauss cm.$^3$/g. Intrinsic coercive force, $H_{ci}$, was 127 oersteds at 2.5° C. and 166 oersteds at 31° C. Chemical analysis of the purified product gave the following results (expressed in weight percent); Sb, 41.47; In, 14.01; Mn, 38.70; and Cr, 0.84, 0.89. This analysis corresponds to $Mn_{1.53}$, $Cr_{0.40}$, $In_{0.26}$, $Sb_{0.74}$. Other elements shown to be present were O (by direct analysis), 1.49%; Pb, 0.2–1.0%; Sn, 0.2–1.0%; Cu, 200–1000 p.p.m.; Ni, 300–500 p.p.m.; and Si, 100–500 p.p.m.

C. A third preparation was carried out, using a heating cycle of 6 hours at 800–820° C. Single crystals were isolated by cleaving them from the product slug recovered from the reaction. These crystals exhibited maximum saturation induction at 70° C. and had a saturation per gram, $\sigma_s$, at this temperature of 26 gauss cm.$^3$/g. when measured in a field of 14,400 oersteds (see FIG. I). The magnetization in the above field versus temperature was the same whether the crystals were oriented with the cleavage planes perpendicular or parallel to the field and showed no thermal hysteresis. The change of magnetization with temperature in the region of the lower ferromagnetic transition temperature was very rapid.

In the foregoing, two magnetic properties which are important to technical utility of the materials are referred to, viz., the intrinsic coercive force, $H_{ci}$, and the saturation per gram or sigma value, $\sigma_s$. The definition of intrinsic coercive force is given in special technical publication No. 85 of the American Society for Testing Materials, entitled "Symposium on Magnetic Testing" (1948), pp. 191–198. The values for the intrinsic coercive force given herein are determined on a D.C. ballistic-type apparatus, which is a modified form of the apparatus described by Davis and Hartenheim in the Review of Scientific Instruments, 7, 147 (1936). The sigma value, $\sigma_s$, is defined on pages 7 and 8 of Bozorth's "Ferromagnetism," Van Nostrand Co., New York, 1951. This sigma value is equal to the intensity of magnetization, $I_s$, divided by the density, $d$, of the material. The sigma values given herein are determined on apparatus similar to that described by T. R. Bardell on pp. 226–228 of "Magnetic Materials in the Electric Industry," Philosophical Library, New York, 1955.

PROPERTIES OF COMPOSITIONS

The novel ferromagnetic compositions useful in devices of this invention are characterized by a sharp and reversible increase in saturation induction with rise in temperature at a temperature below the Curie point. The temperature at which this increase occurs is often referred to as the lower ferromagnetic transition temperature to distinguish from the upper transition temperature or Curie point. The unusual dependence of magnetization on temperature at the lower transition temperature is believed to result from a transition from an antiferromagnetic state to a ferrimagnetic state. Thus, at the transition temperature the total quantum mechanical exchange between adjacent sublattices is believed to change sign and it is this exchange inversion which is presumed to be at the basis of the observed change in magnetic properties. The transition is a first order solid-phase-to-solid-phase transition with maintenance of crystal symmetry and any magnetic material having such a transition is useful according to this invention.

In addition to the increase in the saturation induction with rise in temperature at the exchange inversion temperature, compositions useful in the devices and methods of this invention exhibit changes in other properties which can be employed as a basis for device operation. By way of illustration, properties representative of manganese-chromium and manganese-vanadium antimonides at various temperatures are discussed below. As indicated hereinbefore, these compositions may optionally contain additional elements, e.g., indium.

For compositions having an exchange inversion above about −70° C. in zero or very low magnetic field, a direct transition from a ferrimagnetic state to an antiferromagnetic state occurs on cooling. Compositions having an exchange inversion at a lower temperature, however, have been found by applicant's assignee to exhibit an intermediate state and at sufficiently low temperatures, i.e., below about −170° C., only the transition between the ferrimagnetic state and this intermediate state is observed. All transitions among the three states are first order transitions in the thermodynamic sense. Although the nature of the intermediate state is not fully understood, the magnetic structure in this state differs from the structure in the antiferromagnetic and the ferrimagnetic states referred to above.

The manganese-chromium and manganese-vanadium antimonides useful in the devices of this invention are comprised of a tetragonal crystal structure of the $Cu_2Sb$-type. The symmetry of this structure is unchanged when the compositions are heated or cooled through the lower transition or exchange inversion temperature. Of course, other structures such as MnSb and unreacted ingredients may also be present but it is desirable for many applications that such impurity structures be substantially absent. On the other hand, for certain uses, the tetragonal composition will be combined with other substances, e.g., plastics or substances having conventional magnetic properties to achieve a desired result. For example, by combination with a magnetic substance exhibiting conventional dependence of magnetic properties on temperature composite materials with highly novel magnetic behavior can be obtained as described more fully below.

The manganese-chromium and manganese-vanadium antimonides exhibit cleavage planes perpendicular to the c-axis and have Curie temperatures usually in the range of 180–300° C. The compositions ordinarily melt at about 900° C. or above and have densities in the range of 7.0–7.2 g./cc. at room temperature. Some compositions exhibit thermal hysteresis in transition, i.e., the transition occurs at a higher temperature when approached from a temperature below the transition than when approached from a temperature above the transition. This hysteresis, which ranges from less than 1° C. in low hysteresis materials to as much as 20° C. or more in some products, may be desirable under certain circumstances. However, if temperature hysteresis is of sufficient magnitude to interfere with proper operation of a device, hysteresis can usually be reduced to acceptable levels by an increase in applied magnetic field at an appropriate stage in the hysteresis cycle. Other properties of certain manganese-chromium and manganese-vanadium antimonides are tabulated below.

*Properties of Manganese-Chromium and Manganese-Vanadium Antimonides*

| Property [a] | Value | T° K. |
|---|---|---|
| Young's Modulus (single crystal; Mn, 65.2%; Cr, 1.5%; Sb, 33.3%): | | |
|   a-axis, AF | $14.5 \times 10^{11}$ dynes/cm.$^2$ | 115 |
|   F | $13.3 \times 10^{11}$ dynes/cm.$^2$ | 130–300 |
| Shear Modulus (polycrystalline; Mn, 63.4%; Cr, 3.3%; Sb, 33.3%): | | |
|   AF | $2.85 \times 10^{11}$ dynes/cm.$^2$ | 307 |
|   F | $3.03 \times 10^{11}$ dynes/cm.$^2$ | 307 |
| Coefficient of Linear Expansion (Mn, 62.7–66.0%; Cr, 0.6–4.0%; Sb, 31.6–33.3%; In, 0–1.7%): | | |
|   a-axis, AF | $10 \times 10^{-6}$ ° C.$^{-1}$ | 100 |
| | $13 \times 10^{-6}$ ° C.$^{-1}$ | 200 |
| | $15 \times 10^{-6}$ ° C.$^{-1}$ | 300 |
|   F | $30 \times 10^{-6}$ ° C.$^{-1}$ | 150 |
| | $29 \times 10^{-6}$ ° C.$^{-1}$ | 200 |
| | $26 \times 10^{-6}$ ° C.$^{-1}$ | 300 |
|   c-axis, AF | $20 \times 10^{-6}$ ° C.$^{-1}$ | 100 |
| | $33 \times 10^{-6}$ ° C.$^{-1}$ | 200 |
| | $43 \times 10^{-6}$ ° C.$^{-1}$ | 300 |
|   F | $11 \times 10^{-6}$ ° C.$^{-1}$ | 200 |
| | $22 \times 10^{-6}$ ° C.$^{-1}$ | 300 |
| Expansion at Transition (Mn, 62.7–66.0%; Cr, 0.6–4.0%; Sb, 31.6–33.3%; In, 0–1.7%): | | |
|   a-axis | −0.28% | 150 |
| | −0.20% | 200 |
| | −0.095% | 300 |
|   c-axis | 0.51% | 150 |
| | 0.43% | 200 |
| | 0.26% | 300 |
| Hydrostatic Pressure Coefficient [b] (Mn, 62.7–64.6%; Cr, 2.8–4.2%; Sb, 30.9–33.1%; In, 0–1.7%). | 8,300 p.s.i./° C | 275 |
| | 7,500 p.s.i./° C | 300 |
| | 5,700 p.s.i./° C | 350 |
| Permeability—Field Parallel to c-axis (Mn, 63.4%; Cr, 3.3%; Sb, 33.3%; $T_t = 303°$ K.): | | |
|   Field— | | |
|     100 oersteds | 15 gauss/oersted | 318 |
|     200 oersteds | 10 gauss/oersted | 318 |
|     500 oersteds | 5 gauss/oersted | 318 |
|     1,000 oersteds | 3 gauss/oersted | 318 |
|     2,000 oersteds | 2 gauss/oersted | 318 |
|     5,000 oersteds | 1.4 gauss/oersted | 318 |
| Field Perpendicular to c-axis (Mn, 64.2%; V, 2.5%; Sb, 33.3%; $T_t = 170°$ K.) | | |
|   Field— | | |
|     1,500 oersteds | 1.33 gauss/oersted | 293 |
|     2,000 oersteds | 1.36 gauss/oersted | 293 |
|     3,000 oersteds | 1.35 gauss/oersted | 293 |
|     5,000 oersteds | 1.32 gauss/oersted | 293 |
|     20,000 oersteds | 1.11 gauss/oersted | 293 |
| Saturation Magnetization,[c] $\sigma_s$ (Mn, 62.3–65.0%; Cr, 1.7–4.4%; Sb, 33.3%). | 39 gauss cm.$^3$/g | 100 |
| | 34 gauss cm.$^3$/g | 200 |
| | 25 gauss cm.$^3$/g | 300 |
| | 13 gauss cm.$^3$/g | 400 |
| Magnetic Field Coefficient [d] (Mn, 62.7–65.2%; Cr, 0.7–4.2%; Sb, 30.9–33.3%; In, 0–1.7%). | −1,100 oersteds/° C | 100 |
| | −2,200 oersteds/° C | 200 |
| | −2,700 oersteds/° C | 300 |
| | −1,500 oersteds/° C | 400 |
| Residual Induction [e] (Mn, 63.4%; Cr, 3.3%; Sb, 33.3%): | | |
|   After removal of saturating field | 1,600 gauss | 300 |
|   After removal of saturating field and thermally cycling to AF state and back. | 300 gauss | 300 |
| Electrical Resistivity (Mn, 64.6–66.4%; Cr, 0.3–2.9%; Sb, 30.9–33.3%; In, 0–1.7%): | | |
|   AF | $35 \times 10^{-6}$ ohm-cm | 4 |
| | $95 \times 10^{-6}$ ohm-cm | 50 |
| | $175 \times 10^{-6}$ ohm-cm | 100 |
| | $265 \times 10^{-6}$ ohm-cm | 200 |
| | $305 \times 10^{-6}$ ohm-cm | 300 |
|   F | $5 \times 10^{-6}$ ohm-cm | 4 |
| | $20 \times 10^{-6}$ ohm-cm | 50 |
| | $50 \times 10^{-6}$ ohm-cm | 100 |
| | $135 \times 10^{-6}$ ohm-cm | 200 |
| | $210 \times 10^{-6}$ ohm-cm | 300 |
| | $265 \times 10^{-6}$ ohm-cm | 400 |
|   I | $25 \times 10^{-6}$ ohm-cm | 4 |
| | $65 \times 10^{-6}$ ohm-cm | 50 |
| | $125 \times 10^{-6}$ ohm-cm | 100 |
| Thermoelectric Power Versus Cu (Mn, 65.0–65.9%; Cr, 0.8–1.7%; Sb, 33.3%; $T_t$ below 210° K.). | 7 to $8 \times 10^{-6}$ volt/° C | 300 |
| Thermal Conductivity (Mn, 64.6%; Cr, 2.9%; Sb, 30.9%; In, 1.6%): | | |
|   AF | 0.059 watts/cm. ° C | 208 |
|   AF | 0.049 watts/cm. ° C | 273 |
|   F | 0.060 watts/cm. ° C | 303 |
| Heat Capacity at Constant Pressure (Mn, 64.3–65.2%; Cr, 1.5–3.3%; Sb, 31.6–33.3%; In, 0–1.7%). | 13.2 cal./mole ° C | 100 |
| | 19.4 cal./mole ° C | 200 |
| | 22.0 cal./mole ° C | 300 |
| Transition Entropy [f] (Mn, 62.7–65.2%; Cr, 0.7–4.2%; Sb, 30.9–33.3%; In, 0–1.7%). | 0.35 cal./mole ° C | 150 |
| | 0.40 cal./mole ° C | 200 |
| | 0.31 cal./mole ° C | 300 |
| | 0.11 cal./mole ° C | 400 |

[a] Composition used in preparing samples for measurement is shown in parentheses.
  AF = antiferromagnetic state.
  F = ferrimagnetic state
  I = intermediate state
  $T_t$ = exchange inversion temperature
[b] Change in pressure per degree change in transition temperature at constant field.
[c] With sample in ferrimagnetic state, corrected for residual magnetization observed at temperatures below exchange inversion temperature. Method (b).
[d] Change in field per degree change in transition temperature at constant pressure.
[e] See Bozorth, loc. cit., pages 4 and 5.
[f] Calculated by the Clausius-Clapeyron relation from field coefficients and change in magnetization at exchange inversion. Calculated values agree with values determined by direct calorimetric measurement.

Although as indicated the specific compositions described above exhibit properties which render them particularly useful in the energy transducing devices of this invention, it will be appreciated that any material exhibiting such properties can be used as the basic component of these devices. In other words, any material which exhibits a sharp increase in saturation induction with rise in temperature at a temperature below the Curie point of the material can be employed as the magnetic component of these devices. For many applications, the devices will employ a component having a sharp increase in saturation induction between −150° C. and +200° C. In devices operating near room temperature, it is preferred that this sharp increase occur between −50° and +75° C.

COMPOSITE COMPONENTS

Certain of the novel devices of this invention employ a composite magnetic component consisting of a magnetic material of the type described above (first element) in combination with a magnetic material of the usual type, viz., a material whose magnetic response decreases monotonically with increasing temperature below the Curie point and is zero at higher temperatures (second element). By suitable choice of these elements, composite magnetic components can be constructed which exhibit a pronounced maximum in saturation induction over a narrow temperature interval and much lower saturation induction at both lower and higher temperatures. Composite components whose saturation induction is a minimum within a narrow temperature range or is substantially constant over a desired temperature range can also be constructed. The magnetic elements making up the composite component can be united in any manner which does not disturb their individual magnetic characteristics, e.g., by lamination of sheets, butting of massive forms, compaction of powder mixtures and the like.

When a composite magnetic component is employed, the second ferromagnetic element, i.e., the element exhibiting conventional dependence of saturation induction on temperature is selected on the basis of its Curie point and saturation induction in relation to the lower transition temperature and saturation induction of the first component. The position and magnitude of the temperature range over which the composite component exhibits maximum or minimum saturation induction depends on the relative temperatures at which the Curie point and lower transition point occur. For example, a composite component made up of manganese germanide (Curie point 40° C.) and manganese-chromium-indium antimonide having a lower transition temperature of 40° C. exhibits a pronounced minimum in saturation induction at about 40° C. By suitable adjustment in the relative amounts of manganese germanide and quaternary antimonide employed in this composite, the saturation induction at temperatures above about 80° C. can be made equivalent to, higher than, or lower than the saturation induction at temperatures below about 25° C.

OTHER ELEMENTS OF DEVICES

In the novel devices of this invention, the elements which provide heat to or remove heat from the magnetic element, which magnetize and demagnetize the magnetic element, which apply mechanical or electrical energy to the magnetic element and which collect and detect the new form of energy produced are conventional in the art. For example, by introducing a pivotal element, with a magnetic component as just described, in a magnetic field and having means for magnetizing the magnetic component, the pivotal element can be caused to move in said field. In this way, mechanical work can be done. The pivotal element can be an armature, an oscillating arm, or a metering device. Motion can also be obtained by exploiting thermal expansion properties of the exchange inversion material.

The devices of this invention are illustrated by the following examples.

EXAMPLE I

This example illustrates the use of a manganese-chromium-indium antimonide in the construction of a thermomagnetic generator. A flat disk ½″ in diameter and 0.045″ thick was prepared from a manganese-chromium-indium antimonide represented by the formula $$Mn_{7.2}Cr_{0.8}In_{0.6}Sb_{3.4}$$

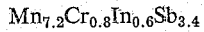

having an exchange inversion temperature somewhat above room temperature by pressing in a mold under a pressure of about 30,000 p.s.i. at room temperature. This disk was placed across and in contact with the poles of a magnet having a field strength of about 1000 gauss. A coil consisting of 300 turns of No. 44 enameled copper wire was wrapped around the magnet and connected to a microvolt amplifier which in turn was connected to a recorder. The disk was heated above the exchange inversion temperature by illumination with a beam of light produced by a microscope illuminator having a 108-watt lamp. By means of a manually operated shutter, periods of illumination about 10 seconds in length were alternated with periods of about equal duration during which the light beam was interrupted. Variations in voltage occurred corresponding to the variations in light intensity.

EXAMPLE II

This example illustrates the use of a manganese-chromium-indium antimonide in the construction of a solar motor operating on a heating and cooling cycle in the region of the lower transition temperature. This motor possesses an advantage over similar motors constructed from conventional magnetic materials in that the magnetic material can be selected to have a sharp transition in a desired temperature range thereby permitting most efficient use of the heat available.

A disk approximately 2″ in diameter was carefully cut from a thin mica sheet and a small hole drilled through the center. Through this hole a thin pyrex tube was passed perpendicular to the plane of the disk to serve as a bearing. The disk was fastened to this tube with cement. An axle was placed within the tube and supported at the ends.

Magnetic particles represented by the formula (by analysis), $Mn_{5.95}Cr_{0.38}In_{0.54}Sb_{3.0}$, were adhered at the edge of each face of the wheel in a band ⅛″ wide by means of silver paste of the air-drying type. After thorough drying, the rim of the wheel was coated with soot from a small candle to enhance heat absorption.

The stator of the motor was a magnet having a field strength of 4800 gauss with facing pole pieces approximately ¾″ in diameter and ¾″ apart. The axle was mounted in a horizontal position parallel to and about 1½″ away from the center line of the pole pieces with the plane of the mica wheel centered in the gap. A beam of light from a lamp consuming 6 amperes at 6 volts was focused so that an image of the filament was produced on each side of the rim of the wheel at a position just above the magnet poles. When the light was turned on, the wheel rotated steadily making a complete revolution in slightly less than one minute. This motor readily raised a mass of 255 mg. mounted at a distance of 2 cm. from the center of rotation.

In place of the lamp, sunlight was focused onto the wheel using a spherical lens of 8½ principal focal length and 3¼″ in diameter. In order to prevent overheating, the image of the sun was defocused somewhat and only about half of the area of the spot impinged on the wheel. Under these conditions, the motor turned readily and raised the 255 mg. weight in about 18 seconds.

EXAMPLE III

This example illustrates the construction of a magnetic switch useful in automatic control and alarm devices.

A flexible brass reed (4 of FIG. III) measuring .008″ thick x 1/32″ wide x ¾″ long was firmly mounted at one end so that the free end was adjacent to the poles of a horseshoe magnet 5. To this end were attached electrical contacts, normally closed, and a small piece of manganese-chromium-indium antimonide 6 prepared from a mixture containing these elements in the atomic proportions 7.2:0.8:0.6:3.4. (This antimonide exhibited a lower transition temperature of about 40° C. and a maximum saturation induction at about 100° C.). When the antimonide was warmed above 40° C., it was attracted to the poles of the horseshoe magnet causing the electrical contacts to open. As illustrated in FIG. III, this switch 1 was connected in series with a 6-volt dry cell battery 2, a small resistance of about 8.6 ohms 3 and a flashlight bulb 7. The resistance was so placed that when current passed through it the heat produced heated the quaternary antimonide. In operation, when the switch was closed, current flowed through the resistor and the lamp until heat from the resistor caused the antimonide to become sensibly magnetic. When this occurred, the antimonide was attracted by the magnet, opening the electrical contacts and interrupting the current flow. When the antimonide had again cooled to a less magnetic state, it was no longer attracted to the magnet and returned to its original position with the electrical contacts closed and the current flowing. This device thus operated as a blinker light.

The control temperature of such a device can be very precisely and reproducibly adjusted by choice of the proper composition for the magnetic material and remains highly stable over prolonged periods of time. Minor adjustments in control temperature can be provided for, if desired, by the incorporation of means to apply mechanical pressure to the antimonide. Any expedient means may be used to return the armature to its original position. This includes, for example, springs, flexible rods or gravity by proper positioning of the device.

It will be apparent that the position of the antimonide component 6 and the magnetic poles 5 can be interchanged if desired, and devices constructed along these lines have given very satisfactory service as blinker lights. One such device employs a pellet (ca. 3/8" in diameter and 1/16" thick) of a material which undergoes exchange inversion at 90° C. and has the permanent magnet mounted on a 10:1 lever arm actutaing a precision, snap action switch. The switch controls current passing through the blinker light and through the resistor heating the exchange inversion material. The device requires a temperature variation in the exchange inversion material of only ±1° C. for operation. Devices of this type have performed satisfactorily for over 500,000 on-off cycles with no evidence of mechanical failure or deterioration in exchange inversion material.

EXAMPLE IV

This example illustrates the consrtuction of a radiometer, i.e., a device for measuring radiation intensity (see FIG. IV). A disc shaped pellet 16 measuring approximately 1/2" in diameter by 1/16" in thickness fabricated from a crystalline powder of manganese-chromium-indium antimonide represented by the formula

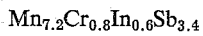

$$Mn_{7.2}Cr_{0.8}In_{0.6}Sb_{3.4}$$

was employed. Due to the method of fabrication, the easy directions of magnetization, i.e., the tetragonal axes, of the tiny crystals composing the powder were aligned at an average angle of about 60° to the broad faces of the pellet. A small amount of manganese antimonide, MnSb, was randomly distributed throughout the pellet. This pellet was cemented to the center of the tungsten rod 17 having sharply pointed ends. The rod was mounted vertically between two copper bearings 18 so that the pellet was centered between the poles 19 of a permanent magnet having a field strength of about 4800 oersteds. Due to the lack of crystal anisotropy in the magnetic response of the randomly oriented MnSb, the pellet assumed a position such that its broad faces were parallel to the center line of the pole pieces. One face of the pellet was then illuminated using a microscope illuminator having a lamp of 108 watts. The lamp filament was focused on the face of the pellet. Under these conditions, the pellet was observed to turn through an angle of about 60°. When the intensity of the radiation falling on the pellet was decreased by insertion of neutral density filters into the light beam, the angle through which the pellet had turned decreased in a step-wise manner. It was restored to its initial position by turning off the light. Thus, the intensity of radiation falling on the pellet was measured by the angle through which the pellet turned. If desired, a pointer or optical system may be added to the device which together with a suitably calibrated scale will enable intensity of illumination to be read directly.

The resistance of the pellet to turning can be increased, and the range of intensity which can be measured thereby enlarged, by increasing the proportion of conventional magnetic material, e.g., MnSb, in the pellet or by provision of appropriate mechanical components, such as springs.

EXAMPLE V

A reciprocating engine is illustrated in this example (see FIG. V). A pellet 20 (about 0.33 g.) of manganese-chromium-indium antimonide, prepared from a mixture containing the elements in the atomic ratios of 7.2:0.8:3.8:0.2 (lower transition temperature 80° C.; maximum saturation induction temperature 120° C.) was attached to one end of a 1/8" diameter phenol formaldehyde resin tube 21 2" in length. To the other end of the tube was attached a similar pellet 22 of $Mn_5Ge_3$ (Curie temperature 45° C.). The tube bearing the pellet was attached at its center perpendicularly to the lower end of a similar tube (8" long) mounted as a pendulum 23 so that the pellets were in a plane of the pendulum's swing. One pole (about 1" wide) of a horseshoe magnet 24 having a rated field strength of about 3000 oersteds was placed so that the pole face was about 1/4" below the rest position of the pendulum. The pellet of $Mn_5Ge_3$ was attracted to the magnetic pole causing the pendulum to be deflected from the vertical. Two projector lamps 25 were arranged so that the light from one was focused on the $Mn_5Ge_3$ pellet and from the other on the antimonide pellet. The radiation from the lamps caused the pellets to exceed, respectively, the Curie temperature and the lower transition temperature. When this occurred, the $Mn_5Ge_3$ pellet was no longer attracted to the magnetic pole while the antimonide pellet was so attracted and the pendulum was pulled to a position (indicated by dotted lines in FIG. V) with the antimonide pellet close to the pole face. In this position, the pellets were no longer illuminated by the projection lamps and soon cooled sufficiently to pull the pendulum back to its former position. The rate of oscillation of the pendulum was controlled by rheostats regulating the current supply to the lamps.

In this device, a reciprocating action is obtained having a power stroke on the heating and cooling cycles, i.e., in both directions of motion. Although the example shows a device powered by two lamps, similar devices powered by only a single source of energy, e.g., the sun, can readily be constructed employing suitable shields to block out radiation during the cooling cycle. Sun-powered reciprocating engines possess obvious utility, for example, as power source in desert locations for pumping water.

EXAMPLE VI

A recording device for indicating whether a predetermined temperature has been attained was constructed as a transformer. The core of this transformer consisted of a rod of material ($Mn_{1.8}Cr_{0.2}In_{0.125}Sb_{0.875}$) having a lower transition temperature at approximately the predetermined temperature which was placed between the ends of a soft iron yoke. A primary or magnetizing coil of 15 turns of No. 18 enameled copper wire was wrapped onto the rod and a secondary or pickup coil of about 100 turns of No. 36 Formvar copper wire was wrapped onto the yoke. When a pulsed D.C. current of 1.3 amperes having a pulse frequency of 1000 cycles/sec. was supplied to the primary coil, an output of 10.3 mv. was observed from the secondary coil. The device was exposed to radiation from an infrared heat lamp for a period of time sufficient to raise its temperature above the lower transition temperature, whereupon the temperature was again reduced to room temperature. The output was now 25.0 mv. Thus, the exposure to the elevated temperature brought about a gain of 14.7 mv. in output. By application of a 60-cycle A.C. field to the input, the transformer was returned to its original state and could again be employed to indicate high temperature exposure. The increase in output occurring during the period of temperature rise can also be employed as a direct indication of temperature.

The temperature sensitive transformer described above can be employed to activate any desired operation or sequence of operations when exposed to elevated temperatures. For example, such a transformer can be employed to control the current supplied to a heating element for a furnace and will then serve as a thermostatic control for the furnace.

EXAMPLE VII

This example illustrates devices employing a composite magnetic component as described above. Such composites exhibit magnetization-temperature curves having either a pronounced maximum (Type A) or a pronounced minimum (Type B) in saturation induction with change in tempearture (see FIG. VI) and may be employed, for example, in devices which maintain a constant temperature difference between two chambers or which cause temperature variations in one chamber to produce related variations in another.

Such a device is illustrated in FIG. VII. In this figure, two chambers 26 and 27 suitably insulated to prevent heat transfer with the surroundings are arranged with side openings adjacent to each other. A non-magnetic bar 28 pivoted at its center is positioned between the chambers with one end extending into each chamber. The ends of the bar support pellets 29 of composite magnetic material adjacent to magnetic poles 30. Stops 31 are positioned between the respective pellets and magnetic poles to prevent excessive tilting of the bar. The end of the bar in chamber 27 actuates a switch 32 which operates through a relay 33 to control a heater 34. The contact of switch 32 may be in position $a$ or position $b$ and the relay 33 may be normally open (as drawn) or normally closed. The temperature in chamber 26 is controlled by the heater 35 which is actuated by the thermostatic switch 36.

A device was constructed employing a material of Type B composed of a mixture of 1 part (by weight) $Mn_5Ge_3$ with 2.5 parts of chromium-manganese-indium antimonide (produced by heating the elements in the proportions indicated by the formula: $Cr_{0.5}Mn_{7.5}In_{0.2}Sb_{3.8}$). The saturation induction temperature curve of this composite showed a pronounced minimum at about 45° C. In one series of tests (Tests 1–3, Table I), this device was employed with the relay 33 in the normally closed position and the contact of switch 32 in position $a$. The thermostat 36 was adjusted to maintain a temperature ($T_1$ in FIG. VI) in chamber 26 as indicated in the table. Switch 32 was closed manually to activate the heater in chamber 27 until a temperature in the vicinity of the desired control temperature $T_2$ had been reached. The temperature maintained by the device in chamber 27 corresponding to various temperatures in chamber 26 is shown in Table VI.

In a second series of tests (Tests 4 and 5, Table I), relay switch 33 was normally open and the contact of switch 32 was in position $b$. During these tests, temperatures in both chambers 26 and 27 were held in the vicinity of $T_1$ in FIG. VI (i.e., to the low temperature side of the minimum). It will be apparent that by employing the start-up procedure used in Tests 1–3, the equipment employed in Tests 4 and 5 would have maintained temperatures in chamber 27 in the range of $T_2$.

TABLE I

| Test No. | Temperature Held in— | |
| --- | --- | --- |
|  | Chamber (26), ° C. | Chamber (27), ° C. |
| 1 | 24 | 69 |
| 2 | 30 | 64 |
| 3 | 32 | 58 |
| 4 | 30 | 30 |
| 5 | 35 | 35 |

EXAMPLE VIII

This example describes the construction of a magnetic balance which has been employed to determine the variation in magnetic response with temperature of a magnetic material. It will be apparent that by simple modification the balance can be converted to other uses.

As illustrated in FIG. VIII the balance consists of an arm supported on a fulcrum 11, one end of the arm is a tube 9 of non-magnetic material, such as glass, through the center of which the leads 10 to a thermocouple are passed. The other end of the arm is a rod carrying adjustable weights 15. Excessive motion of the arm is prevented by stops 14. A closely fitting cap carrying the magnetic material 8 is placed over the open end of the tube 9 in such a position that the thermocouple is in contact with the magnetic material. This end of the arm with attached magnetic material is inserted in a chamber 13 which may be either heated or cooled by conventional means depending upon the temperature range to be employed. Magnetic poles 12 are placed outside this chamber immediately adjacent to the magnetic material in such a position that the magnetic material experiences a non-uniform magnetic field.

In operation, the weights 15 are adjusted until the attraction of the magnetic field for the magnetic material 8 is just counterbalanced. The temperature of the magnetic material is then changed and the weights again adjusted. By repeating this procedure at a number of temperatures, the effect of temperature on the attraction of the magnetic material by the field can be determined. This method was employed in determining the curves shown in FIG. II.

By installing an electrical contact on one of the stops 14, and completing a circuit through the arm, this apparatus can be converted to a temperature activated switch. This switch will maintain the temperature of the space within which the magnetic material is located, e.g., the chamber 13 within desired limits.

EXAMPLE IX

This example illustrates the direct interconversion of thermal and mechanical energy in a device based upon an exchange inversion material. In this device a single crystal of the material was prepared in the form of a parallelepiped 0.2–0.3 inch on each side. One face of the parallelepiped was highly polished and a small V-shaped indentation was made in the opposite face. The parallelepiped was placed at the bottom of a quartz test tube with the face having the V-shaped indentation uppermost and a quartz rod was placed vertically with its lower end engaged in the indentation. The rod was free to move in a vertical direction and the top of the rod actuated the core of a differential transformer. The coils of the transformer were mounted on the top of the quartz tube so that the output of the transformer indicated relative motion between rod and tube. By calibration with precision gauge blocks it was determined that movements of the rod as small as $\pm 10 \times 10^{-6}$ inches could be determined. In operation the lower end of the quartz tube containing the exchange inversion material was heated or cooled as desired at a rate of about 1° C./min. and movement of the quartz rod produced by thermal expansion or contraction of the exchange inversion material was indicated by the output of the differential transformer. The relationship between temperature and motion of the rod at temperatures near the exchange inversion temperature is indicated in FIG. IX for devices in which motion of the rod is due to changes in dimension parallel to the $a$ and $c$ crystallographic directions, respectively, of a manganeses-chromium antimonide having the composition, in atom percent, Mn, 65.5%; Cr, 1.7%; Sb, 32.8%. It will be apparent that motion of the rod can be employed for temperature indication using the device as described and that conversion to a temperature control device can be readily accomplished. By thermostating the exchange inversion material, such devices can be modified for use in sensing magnetic field strength.

EXAMPLE X

The conversion of mechanical to magnetic energy is illustrated by this example describing a device which depends for operation on the change in the magnetic state of an exchange inversion material upon application of mechanical energy. The example also illustrates the use of the device in measuring pressure.

In this device, a flux meter head comprised of two high permeability iron cores forming parallel magnetic circuits was employed. The cores each contained an air gap and were wrapped with a common driving coil consisting of 550 turns of No. 34 magnet wire capable of establishing a peak field of about 1000 oersteds across the air gaps when supplied with a 60 cycle/sec. alternating current of 71 milliamperes. Pickup coils were wrapped around the cores adjacent to the air gaps and were so connected that the output of the coil adjacent one air gap opposed the output of the coil adjacent the other gap. Each of these coils consisted of about 380 turns of No. 40 magnet wire. The coils were balanced by adjusting the exact number of turns so that when a non-magnetic spacer was placed in each of the air gaps the net output of the two coils was zero. When one of these spacers was replaced with a magnetic material, the output of the two coils no longer was balanced and a net output proportional to the first time derivative of the induction in the specimen minus the field flux resulted. The output was fed into an integrating network and smoothing filter to produce a steady D.C. voltage, measured with a potentiometer, proportional to the peak induction value of the magnetic material under the prevailing conditions of temperature and pressure.

The flux meter head with the phenolic insert in one gap and an insert of exchange inversion material in the other was placed in the pressure chamber of a monobloc apparatus constructed according to the description by P. W. Bridgman [Phys. Rev. 48, 893 (1935) and American Scientist 31, 16 (1943)]. The remaining space in the pressure cavity was filled with a low boiling petroleum fraction and a thermocouple was placed adjacent to the exchange inversion material. Leads from the flux meter coils and thermocouple were brought out of the pressure chamber using an epoxy resin seal. The exchange inversion material employed was a manganese-chromium antimonide corresponding to the formula $Mn_{1.88}Cr_{0.12}Sb$.

The flux meter head assembly with the inserts was subjected to pressures ranging up to 10,000 kg./cm.$^2$ at a number of temperatures and the magnetic state of the exchange inversion material under each set of conditions was recorded. FIG. X illustrates the data obtained. It will be noted that the data provides a measure of pressure within the cavity at constant temperature or alternatively a measure of temperature within the cavity at constant pressure. It is also possible to use the output from the pickup coils to actuate controls maintaining predetermined pressure or temperature conditions.

EXAMPLE XI

The compositions useful in devices of this invention are metal-like in temperature dependence of electrical resistance in that resistance increases with increasing temperature at temperatures below and above the temperature at which exchange inversion occurs, i.e., these compositions have in general a positive temperature coefficient of resistance. However, at the exchange inversion temperature resistance drops sharply with increasing temperature and one class of devices for the inter-conversion and control of various forms of energy depends for operation on changes in resistivity associated with exchange inversion. Since exchange inversion is influenced by magnetic field and pressure, as well as by temperature, the resistance effect can be applied in devices for the interconversion and control of electrical energy and thermal, magnetic or mechanical energy.

To illustrate, a specimen of exchange inversion material was connected to a source of square wave, 70 cycle/second, alternating current of known intensity and two connections were applied near the ends of the specimen for measurement of resistance across the specimen. Resistance was measured at a number of temperatures by adjustment of a calibrated variable resistor in series with the specimen until the voltage drop across the variable resistor equaled that across the specimen. The resistance of the specimen was then equal to and could be read directly from that of the variable resistor. The relationship between resistance and temperature of the specimen is indicated for a typical exchange inversion material in FIG. XI. From the figure, it is apparent that change in resistance associated with exchange inversion is a measure of temperature, i.e., the foregoing device is, in fact, a resistance thermometer. The resistance effect can also be applied in control circuits where sensitivity to temperature is desired. As further illustrated by the figure, resistance of exchange inversion material is sensitive as well to magnetic field and by the simple expedient of thermostating the exchange inversion composition, resistance devices can be converted for use in sensing or controlling magnetic fields. Resistance also is sensitive to pressure and the devices can be used in pressure-sensing applications.

EXAMPLE XII

A temperature sensitive resistor, illustrated in FIG. XII, was fabricated from an exchange inversion material corresponding to the formula $Mn_{1.9}Cr_{0.1}Sb_{0.95}In_{0.05}$. The material was first pulverized by grinding in a mortar under liquid nitrogen and powder passing 200 mesh and retained on 270 mesh sieves was employed in the resistor. The powder was spread uniformly over an area ca. 0.5″ x 0.5″ in size on the surface of a phenolic resin support 50 and pressed at about 40,000 p.s.i. at room temperature to produce a coherent conductive film. A number of such films ranging from 1–5 mils in thickness were prepared. In order to provide the desired resistor length (about 3″), portions of the film were scraped away leaving the resistor 51 in the form illustrated. Electrical connections 52 were attached to the ends of the resistor with silver paint. One such resistor had a resistance of 105 ohms at 30° C. and a resistance of 94 ohms at 40° C.

In an alternative construction, a piece of manganese-chromium-indium antimonide was rubbed against a ground glass surface wet with acrylic lacquer. Very fine particles of antimonide remained distributed in the lacquer and a conductive film was formed after the lacquer dried. This film had an electrical resistance of several hundred ohms which was variable with temperature.

EXAMPLE XIII

A pressure-sensitive resistor was constructed by cementing a square single crystal (ca. ¼″ on a side by ca. ³⁄₁₆″ in thickness) of manganese-chromium antimonide having a lower transition temperature of 305° K. between brass and steel plates using epoxy resin. The resin also served to insulate the crystal electrically from the metal plates. The crystal was oriented so that the cleavage planes corresponding to the 001 planes of the crystal were parallel to the metal plates, i.e., the c-axis direction was perpendicular to the plates. A heater was attached to the upper brass plate and a thermocouple was attached to the crystal. Electrical connections were made to opposite edge faces of the crystal to permit passage of current therethrough and connections for measurement of voltage drop were made on one of the intermediate edge faces. The whole assembly was placed on a proving ring between the platens of a press, applied pressure being determined from the deflection of the proving ring.

A current was passed through the pressure-sensitive resistor and resistance relative to the initial resistance was determined as a function of temperature of a number of pressures by heating and cooling through the lower transition of the crystal. The change in relative resistance with pressure applied in the c-axis direction at 307° K. was as follows:

| Pressure (lbs./sq. in.) | Relative Electrical Resistance (Percent) |
| --- | --- |
| 0 | 100 |
| 1,940 | 108 |
| 3,940 | 112 |
| 7,900 | 117 |

EXAMPLE XIV

Magnetic materials whose saturation induction increases strongly with rise in temperature can be employed in the formation and reproduction of images. Such processes for preparing magnetic images comprise exposing to radiant energy in the absence of an externally-applied field, selected areas of a solid layer comprising a ferromagnetic material which exhibits a maximum saturation induction above 0° K. but below the regular Curie temperature, whereby the irradiated areas become more highly magnetized. This maximum is usually above $-150°$ C. and preferably in the range between 0° C. and the Curie temperature. My novel antimonides discussed above are particularly suited for use in processes of image formation because of the fact that the temperature range over which magnetic response increases with increasing temperature can be pre-selected and controlled by appropriate choice of antimonide composition. This novel process for image formation is illustrated by the following example.

A chromium-manganese-indium antimonide (produced by heating the elements in the atomic proportions:

$$Cr_{0.8}Mn_{7.2}In_{0.6}Sb_{3.4}$$

in powder form was converted to a pellet ½" in diameter and approximately 1/16" thick by pressing at 1200 lbs./sq. in. at room temperature. This pellet was fastened to the vertical wall of a small glass vessel, the bottom of which was covered to a depth of about ¼" with finely powdered $Fe_3O_4$. The image of a small round incandescent source was formed by a concave mirror on the surface of the pellet. Where the image of the source impinged on the pellet, the temperature was increased sufficiently to exceed the lower transition temperature (about 46° C.) of the manganese-chromium-indium antimonide and this portion of the pellet became magnetic. When the $Fe_3O_4$ in the bottom of the vessel was agitated by an air jet, the resulting suspended dust was attracted to the magnetic portions of the pellet and deposited thereon forming an image of the light source. The pellet was allowed to cool and the image was transferred to a sheet of paper by pressing the pellet to the paper.

Although in this example the intensity of the image projected onto the pellet of antimonide was such that no half-tone effects were observed, the low temperature transition of this specimen of antimonide occurs over a moderate temperature interval so that half-tone images can be obtained from appropriate subjects.

EXAMPLE XV

A second pellet of the antimonide described in Example XIV was heated above its Curie temperature while in contact with the pole of a bar magnet and then allowed to cool to room temperature. The pellet was removed from the magnet and sprinkled uniformly with ferromagnetic chromium oxide in powder form. An image was projected onto the surface of the pellet carrying the powder by means of a light source and lens causing a portion of the surface to be heated above the lower transition temperature but below the Curie temperature. After this heating, the pellet was immediately picked up, inverted, and tapped lightly to dislodge powder from the unheated portions of the surface. The pellet was then pressed against paper to transfer powder from the heated portions of the surface to the paper. A negative image was produced.

The examples have illustrated energy interconversions achieved by the methods and devices of this invention. When energy is introduced into the magnetic component of these devices under appropriate conditions, the component is caused to traverse the lower magnetic transition or exchange inversion at least in part thereby making energy available in other forms. In many applications only one of these available forms is actually used. However, if desired, two or more forms of energy output can be used simultaneously to accomplish a particular result. For example, the magnitude of one output can be combined with the rate of change of a second output, or one type of output can be used to trigger a desired function which a second type provides feedback for control of the function.

It will be appreciated that in many devices of this invention, the component which exhibits a sharp increase in saturation induction with rise in temperature will comprise in addition to the material responsible per se for the magnetic behavior of the component, one or more additional materials which provide additional properties necessary or desirable for proper functioning of the component. For example, the magnetic material may be in the form of particles dispersed in a binder or matrix. The particles may be aligned or randomly oriented. As binder or matrix, any material, solid or fluid, which provides the desired physical properties and resistance to environmental conditions can be used, such as water, mineral oil, plasticized or implasticized vinyl polymers, natural or synthetic elastomers, epoxy resins, polyamides, polyesters, polyurethanes, plaster of Paris, and the like.

The foregoing detailed description has been given for clearness of understanding only and no unnecessary limitations are to be understood therefrom. The invention is not limited to the exact details shown and described for obvious modifications will occur to those skilled in the art.

In summary, the present invention involves methods of and apparatus for producing useful work from at least one of applied heat energy, mechanical energy, electrical energy and magnetic energy by varying the magnitude of application of at least one of said energies to a structure while its temperature is within that narrow range in which at least one of its energy-transforming components undergoes below its Curie point a reversible first order solid-phase to solid-phase transition with maintenance of crystal symmetry. The several energy-transforming components which meet the foregoing requirements have been set forth at length and will not be here repeated. By means of such an energy-transforming component, there is developed concurrently with the solid-phase to solid-phase transition and as a result of the application of said energy a sharp and substantial change in at least one of (a) the magnetic saturation induction, (b) the electrical resistivity, and (c) a dimension, and upon decrease in the application of said energy in one of said forms producing an opposite change in each of (a) said magnetic saturation induction, (b) said resistivity, and (c) said dimension. Finally, there is provided a method of and means for the utilization of one of the foregoing sharp and substantial changes by converting at least one of them into a work-developing effect in the form of energy in a different form than the applied energy and whose magnitude changes with the magnitude of that applied energy.

The embodiments of the invention in which an exclusive property or privilege is claimed are defined as follows:

1. The method of producing useful work from at least one of applied heat energy, mechanical energy, electrical energy and magnetic energy which comprises varying the magnitude of application of at least one of said energies to a structure while its temperature is within that narrow range in which at least one of its energy-transforming components undergoes below its Curie point a reversible first order solid-phase to solid-phase transition with maintenance of crystal symmetry, developing concurrently with said transition as a result of said application of said energy in one of said forms to said component a sharp and substantial change in at least one of (a) the magnetic saturation induction, (b) the electrical resistivity, and (c) a dimension, and upon decrease in the application of said energy in one of said forms producing an opposite change in each of (a) said magnetic saturation induction, (b) said resistivity, and (c) said dimension, and converting as a result of said changes in (a) said magnetic saturation induction, (b) said resistivity, and (c) said dimension the energy applied in one of said forms into a work-developing effect in the form of energy in a form differing from that of the applied energy and whose magnitude changes with the magnitude of said applied energy.

2. The method of producing useful work from energy in the form of heat which comprises varying the heat energy applied to and taken from a structure while its temperature is within that narrow range in which at least one of its energy transforming components undergoes below its Curie point a reversible first order solid-phase to solid-phase transition with maintenance of crystal symmetry, developing concurrently with said transition as a result of said application of said heat energy to said component through said range a sharp and substantial change in at least one of (a) the magnetic saturation induction, (b) the electrical resistivity, and (c) a dimension, and upon decrease in the application of said heat energy through said range producing an opposite change in each of (a) said magnetic saturation induction, (b) said resistivity, and (c) said dimension, and converting at least one of said changes in (a) said magnetic saturation induction, (b) said resistivity, and (c) said dimension into a work-developing effect whose magnitude changes with said applied heat energy.

3. The method of producing useful work from energy in the form of heat which comprises varying the heat energy applied to and taken from a structure while its temperature is within that narrow range in which at least one of its energy transforming components undergoes below its Curie point a reversible first order solid-phase to solid-phase transition with maintenance of crystal symmetry, developing from said application of said heat energy to said component through said range (a) a sharp and substantial increase in the magnetic saturation induction of said component, (b) a sharp and substantial decrease in the electrical resistivity, and (c) a substantial change in at least one dimension of said component and upon decrease in the application of said heat energy through said range producing an opposite change in each of (a) said magnetic saturation induction, (b) said resistivity, and (c) said dimension, and converting at least one of said changes in (a) said magnetic saturation induction, (b) said resistivity, and (c) said dimension into a work-developing effect whose magnitude changes with said applied heat energy.

4. The method of producing useful work from energy in the form of heat which comprises varying the heat energy applied to and taken from a structure while its temperature is within that narrow range in which at least one of its energy transforming components undergoes below its Curie point a reversible first order solid-phase to solid-phase transition with maintenance of crystal symmetry, developing concurrently with said transition as a result of said application of said heat-energy to said component through said range a sharp increase in said magnetic saturation induction of at least five-fold its initial value and with a decrease in said application of said heat-energy through said range producing a sharp decrease in said magnetic saturation induction of at least one-fifth its maximum value, and converting at least one of said changes in said magnetic saturation induction into a work-developing effect whose magnitude changes with change in said magnetic saturation induction.

5. The method of producing useful work from energy in the form of heat which comprises varying the heat energy applied to and taken from a structure while its temperature is within that narrow range in which at least one energy transforming component undergoes below its Curie point a reversible first order solid-phase to solid-phase transition with maintenance of crystal symmetry and which component comprises at least two elements selected from the class consisting of vanadium, chromium, manganese, niobium, molybdenum, tantalum, tungsten and rhenium in total amount of 35–95 atom percent, and at least one of said elements being selected from the class consisting of vanadium, chromium and manganese, a total of from 5–40 atom percent of at least one element of the class consisting of arsenic, antimony and bismuth, and from zero to 30 atom percent of a member of the class consisting of cadium, gallium, indium, lead, thallium, tin, zirconium, scandium, yttrium, magnesium and zinc, developing concurrently with said transition as a result of said application of said heat-energy to said component through said range a sharp increase in said magnetic saturation induction of at least five-fold its initial value and with a decrease in said application of said heat-energy through said range producing a sharp decrease in said magnetic saturation induction of at least one-fifth its maximum value, and converting at least one of said changes in said magnetic saturation induction into a work-developing effect whose magnitude changes with change in said magnetic saturation induction.

6. A system of producing useful work from at least one of applied heat energy, mechanical energy, electrical energy and magnetic energy which comprises a structure having at least one energy-transforming component which within a narrow temperature range below its Curie point undergoes a reversible first order solid-phase to solid-phase transition with maintenance of crystal symmetry, means for positioning said structure relative to a source of energy in one of said forms for flow of said energy to and from said structure while within said narrow temperature range for developing concurrently with said transition as a result of the application of said energy in one of said forms to said component through said range a sharp and substantial change in at least one of (a) the magnetic saturation induction, (b) the electrical resistivity, and (c) a dimension, and with a decrease in the application of said energy in one of said forms producing an opposite change in each of (a) said magnetic saturation induction, (b) said resistivity, and (c) said dimension, and means responsive to said changes in (a) said magnetic saturation induction, (b) said resistivity, and (c) said dimension for producing a work-developing effect in the form of energy in a form differing from that of the applied energy and whose magnitude changes with the magnitude of said applied energy.

7. A system of producing useful work from at least one of applied heat energy, mechanical energy, electrical energy and magnetic energy which comprises a structure including at least one energy-transforming component which undergoes within a narrow temperature range below its Curie point a reversible first order solid-phase to solid-phase transition with maintenance of crystal symmetry and which component comprises at least two elements selected from the group consisting of vanadium, chromium, manganese, niobium, molybdenum, tantalum, tungsten and rhenium in total amount of 35–95 atom percent, and at least one of said elements being selected from the class consisting of vanadium, chromium and manganese, a total of from 5–40 percent of at least one element of the class consisting of arsenic, antimony and bismuth, and from zero to 30 atom percent of a member of the class consisting of cadmium, gallium, indium, lead, thallium, tin, zirconium, scandium, yttrium, magnesium and zinc, means for positioning said structure relative to a source of energy in one of said forms for flow of said energy to and from said structure and for varying the magnitude of one of said energies while said structure is within said narrow temperature range for producing a sharp and substantial change in at least one of (a) the magnetic saturation induction, (b) the electrical resistivity, and (c) a dimension, and means coupled to said structure responsive to a change in at least one of (a) said mangetic saturation induction, (b) said resistivity, and (c) said dimension for converting the energy applied in one of said forms into a work-developing effect in the form of energy in a form differing from that of the applied energy and whose magnitude changes with the magnitude of said applied energy.

8. A system of producing useful work from energy in the form of heat which comprises a structure having at least one energy-transforming component which within a narrow temperature range below its Curie point undergoes a reversible first order solid-phase to solid-phase transition with maintenance of crystal symmetry, means for positioning said structure relative to a source of heat energy for flow of heat energy to and from said structure while within said narrow temperature range for developing concurrently with said transition as a result of said application of said heat-energy to said component through range a sharp increase in said magnetic saturation induction of at least fivefold its initial value and with a decrease in said application of said heat-energy through said range producing a sharp decrease in said magnetic saturation induction of at least one-fifth its maximum value, and means responsive to change in said magnetic saturation induction for producing a work-developing effect whose magnitude changes with change in said magnetic saturation induction.

References Cited in the file of this patent

General Electric Research Laboratory Bulletin, Fall issue, 1962; pages 19 to 24.

Revue Scientifique 77, 498–500 (1939).